(12) United States Patent
Wilson

(10) Patent No.: US 7,073,859 B1
(45) Date of Patent: Jul. 11, 2006

(54) PIVOTABLE CHILD SEAT FOR USE IN A VEHICLE

(75) Inventor: Pamela S. Wilson, 8618 W. 109th Ter., Overland Park, KS (US) 66210

(73) Assignee: Pamela S. Wilson, Leawood, KS (US)

( * ) Notice: Subject to any disclaimer, the term of this patent is extended or adjusted under 35 U.S.C. 154(b) by 0 days.

(21) Appl. No.: 10/921,399

(22) Filed: Aug. 19, 2004

(51) Int. Cl.
*A47C 1/08* (2006.01)
(52) U.S. Cl. .............................. 297/256.1; 297/256.12; 297/256.13; 297/250.1
(58) Field of Classification Search ............ 297/256.1, 297/256.12, 256.13, 256.14, 256.16, 250.1, 297/344.23
See application file for complete search history.

(56) References Cited

U.S. PATENT DOCUMENTS

| | | | |
|---|---|---|---|
| 4,709,960 A | 12/1987 | Launes | |
| 4,936,629 A * | 6/1990 | Young | 297/256.12 |
| 4,971,392 A * | 11/1990 | Young | 297/256.12 |
| 5,183,312 A * | 2/1993 | Nania | 297/256.12 |
| 5,380,062 A * | 1/1995 | Nania | 297/256.13 |
| 5,494,331 A | 2/1996 | Onishi et al. | |
| 5,660,430 A * | 8/1997 | Clarke | 297/130 |
| 6,260,920 B1 * | 7/2001 | Tolfsen | 297/256.16 |
| 6,322,142 B1 * | 11/2001 | Yoshida et al. | 297/250.1 |
| 6,739,661 B1 * | 5/2004 | Dukes | 297/256.13 |
| 2002/0145319 A1 * | 10/2002 | Tsugimatsu et al. | 297/256.13 |
| 2002/0163232 A1 * | 11/2002 | Vezinet et al. | 297/256.12 |
| 2003/0151285 A1 * | 8/2003 | Keegan et al. | 297/256.13 |
| 2003/0160486 A1 * | 8/2003 | Dukes | 297/256.13 |
| 2005/0077765 A1 * | 4/2005 | Biaud | 297/256.16 |

* cited by examiner

*Primary Examiner*—Peter M. Cuomo
*Assistant Examiner*—Sarah B. McPartlin
(74) *Attorney, Agent, or Firm*—Eleanor M. Musick; Procopio Cory Hargreaves & Savitch LLP

(57) ABSTRACT

The child safety seat includes a seat body that is attached to a base that is held in place by the vehicle seat belt. The base provides for movement of the seat body around at least one axis. A turntable allows the seat body to be rotated from a safe-riding position to face the car door to facilitate positioning the child in the seat or to make it easier to grasp and maneuver a separable child carrier with the child in it. Inadvertent rotation of the turntable is prevented by a locking mechanism that remains engaged until released by the parent or caregiver. In one embodiment, a second axis of movement allows the seat body to be reclined so that the child's head is supported when he or she falls asleep. The reclining adjustment is a motorized motion which can be remotely controlled by the parent or caregiver sitting in the front of the vehicle via wires connected to a remote control.

18 Claims, 13 Drawing Sheets

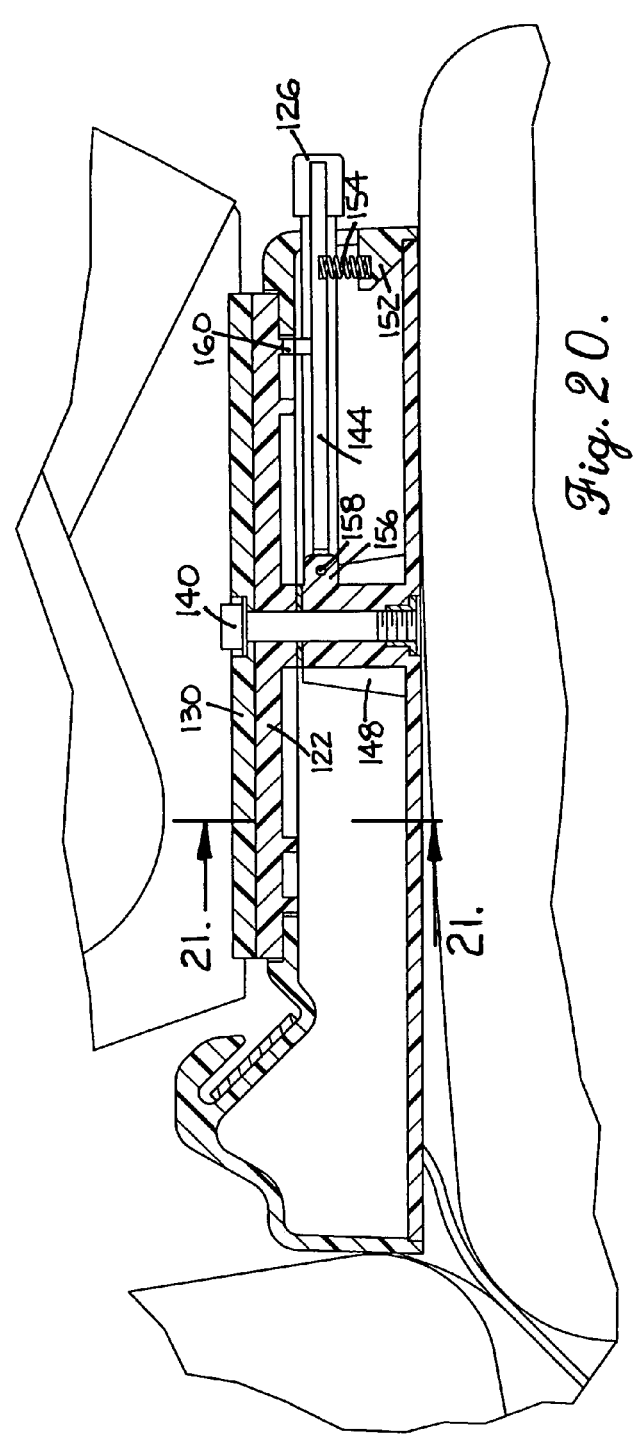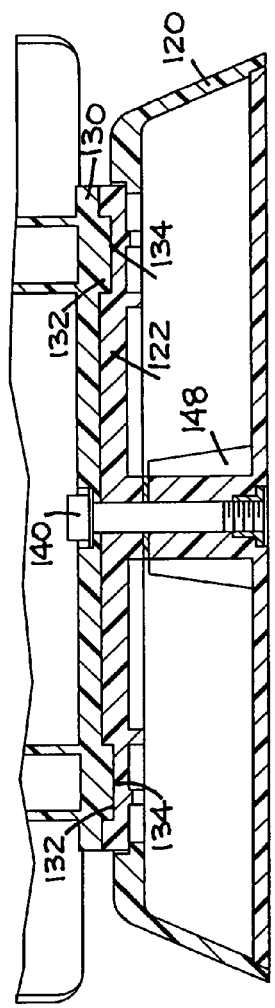

PIVOTABLE CHILD SEAT FOR USE IN A VEHICLE

FIELD OF THE INVENTION

The present invention relates to a child safety seat for use in a vehicle and more particularly, to a child safety seat that swivels to facilitate placement and removal of the child from the seat.

BACKGROUND OF THE INVENTION

The motor vehicle code in many states has been amended in recent years to require that all children under specified weights be securely fastened in an appropriate child safety seat while riding in a vehicle. Recent amendments also prohibit children from riding in the front passenger seat of a vehicle with an automatic air bag that is not disabled. These laws, plus the general concern of a parent or caretaker for the child's safety, have resulted in a need for the parent or caretaker to awkwardly lift the child while trying to reach into the vehicle to guide the child into or out of the seat. This is particularly a problem if the vehicle does not have rear doors.

Some commercially-available child safety seats include a reclining mechanism which allows the seat to be adjusted to keep the child in a comfortable position when he or she falls asleep while in the seat. See, for example, U.S. Pat. No. 5,494,331 and U.S. Pat. No. 4,709,960. While these reclining seats may make it somewhat easier to insert the child into or remove the child from the seat, the adult must still approach the seat from an awkward angle that risks bumping the child into some part of the vehicle interior and/or back strain for the adult who is simultaneously bending, stretching and lifting a child weighing as much as 40 or 50 pounds.

Accordingly, the needs still remains for a child safety seat which is moveable to facilitate positioning the child in the seat and removing the child from the seat. The present invention is directed to such a seat.

BRIEF SUMMARY OF THE INVENTION

It is an object of the present invention to provide a child safety seat for use in a vehicle in which the seat can be rotated for ease of access.

It is another object of the invention to provide an infant seat for use in a vehicle in which the seat can be moved in two axes, rotating for ease of access and reclining.

In a first exemplary embodiment, the child seat of the present invention includes a separable infant carrier/seat body that is releasably attached to a base. The base is positioned facing rearward on the vehicle seat and held in place by the vehicle seat belt. The base provides for movement of the seat body around two different axes. A turntable allows the seat body to be rotated 90 degrees to face the car door to facilitate positioning the child in the seat or to make it easier to grasp and maneuver the separable child carrier with the child in it. Inadvertent rotation of the turntable is prevented by a locking mechanism that remains engaged until released by the parent or caregiver.

The second axis of movement allows the seat body to be reclined so that the child's head is supported when he or she falls asleep. The reclining adjustment is a motorized motion which can be remotely controlled by the parent or caregiver sitting in the front of the vehicle via wires connected to a remote control.

In a second exemplary embodiment, a toddler seat is attached to a base positioned facing forward and fastened in place by the vehicle seat belt. The base has a turntable which allows the seat body to be rotated 90 degrees to face the car door to facilitate positioning the child in or removing the child from the seat. Rotation of the turntable is prevented by a locking mechanism that remains engaged until released by the parent or caregiver.

In a first aspect, the child safety seat of the present invention comprises a seat body having a seat section and a backrest; a base having means for securing to a vehicle seat, the base comprising a turntable for supporting the seat body, the turntable having a plurality of fixed angle positions corresponding to a safe-riding position and at least one load/unload position; and a locking mechanism for releasably locking the turntable at one of the plurality of fixed angle positions, wherein the turntable remains locked at one of the plurality of fixed angle positions until released.

In another aspect of the invention, the child safety seat further comprises a remotely-adjustable recliner mechanism disposed between the seat body and the base, the recliner-mechanism comprising a drive motor attached to the turntable; a gear extending upwardly from the turntable, the gear driven by the drive motor; a back plate separably attached to the seat back; a rack disposed in the back plate, wherein the rack cooperates with the gear to control inclination of the back plate; a remote control for controlling the drive motor for adjusting inclination of the back plate; a power cord for supplying power to the drive motor; and a cord connecting the remote control to the drive motor. Arcuate guide rails extending upward from the turntable and arcuate channels disposed in the back plate cooperate to support the back plate on the turntable and to guide inclination of the back plate in an arcuate motion.

BRIEF DESCRIPTION OF THE DRAWINGS

The accompanying drawings, which are incorporated in and form a part of the specification, illustrate exemplary embodiments of the present invention and, together with the description, disclose the principles of the invention, wherein:

FIG. 20 is a cross-sectional view taken along line 20—20 of FIG. 16.

FIG. 21 is a cross-sectional view taken along line 21—21 of FIG. 20.

DETAILED DESCRIPTION OF THE PREFERRED EMBODIMENTS

Figure 1:
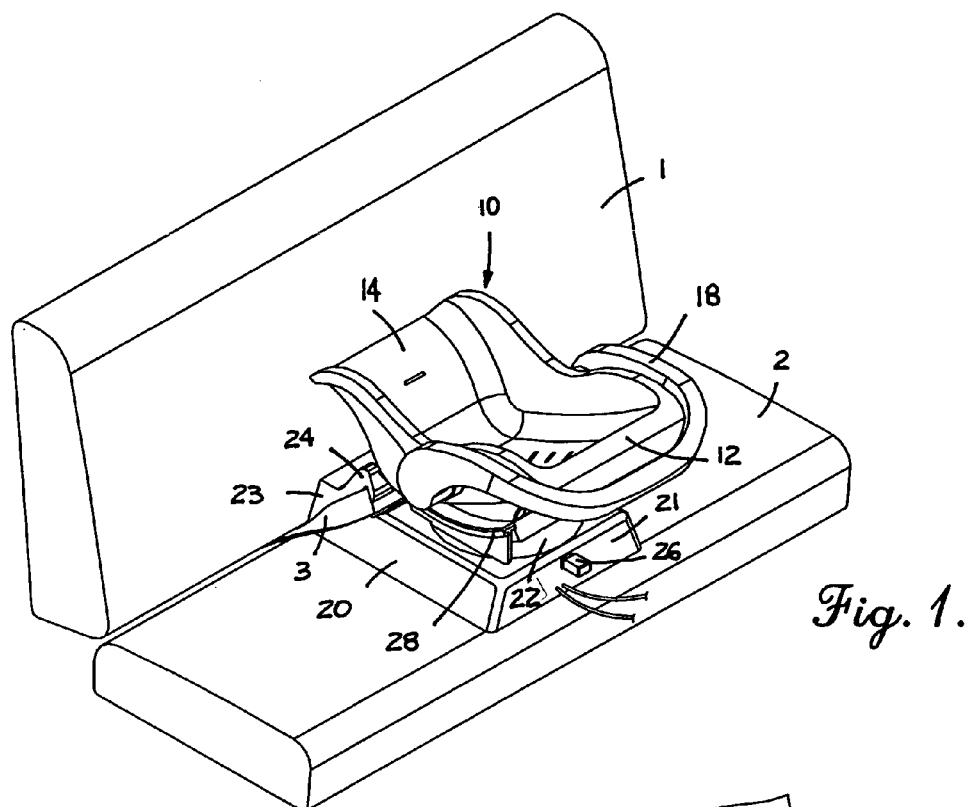
FIG. 1 is a perspective view of a first embodiment of the present invention showing the child seat in a reclined position.
Figure 2:
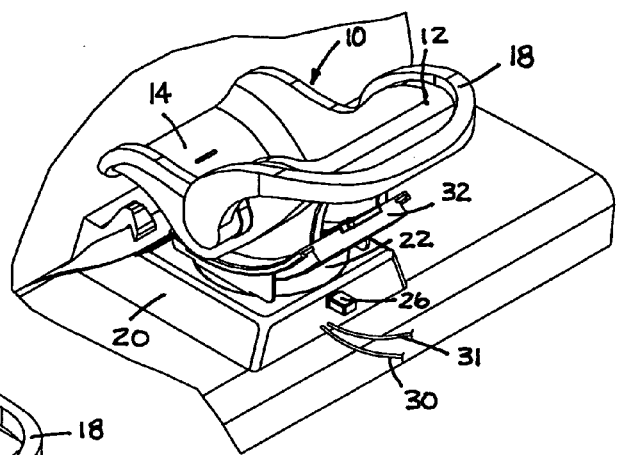
FIG. 2 is a perspective view showing the child seat in an upright position.

As illustrated in FIGS. 1–2, a first embodiment of the present invention retains the child in a rear-facing position while the vehicle is in motion, which has been determined to be the safest for infants (under one year old and 20 pounds in weight). In this embodiment, the child seat includes a separable infant carrier/seat body 10 is releasably attached to a base 20. The base 20 is positioned on the vehicle seat bottom 2 and held in place against the vehicle seat back 1 by vehicle seat belt 3. Hooks 24, loops or other appropriate fasteners are provided on the base 20 for securely holding the seat belt 3 so the child seat does not slide or shift on the vehicle seat.

Figure 3:
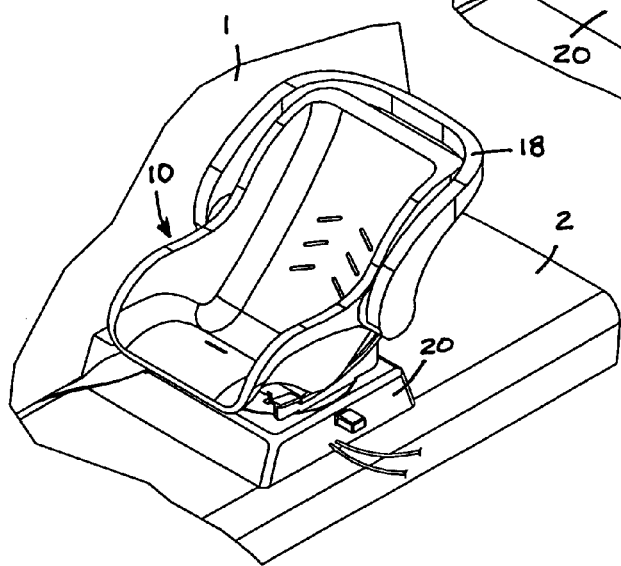
FIG. 3 is a perspective view showing the child seat rotated 90 degrees.

Base 20 provides for movement of the seat body around two different axes. A turntable 22 to which the seat body 10 is attached, allows the seat body 10 to be rotated 90 degrees to face the car door to facilitate positioning the child in the seat or to make it easier to grasp and maneuver the separable child carrier with the child in it. FIG. 3 illustrates the seat body 10 rotated in the 90 degree position for entrance into or exit from the vehicle. Such positioning can also be useful for attending to the child, e.g., for feeding or diaper changing, while at a rest stop during an extended drive. Rotation of the turntable 22 is prevented by a locking mechanism which remains engaged until turntable release 26 extending from the front 21 of base 20 is depressed by the parent or caregiver.

The second axis of movement allows the seat body 10 to be reclined so that the child's head is supported when he or she falls asleep. The reclining adjustment is a motorized motion which can be remotely controlled by the parent or caregiver sitting in the front of the vehicle via wires 30, 31 connected to a remote control 8 (shown in FIG. 5) that is positioned for ready access.

Figure 4:
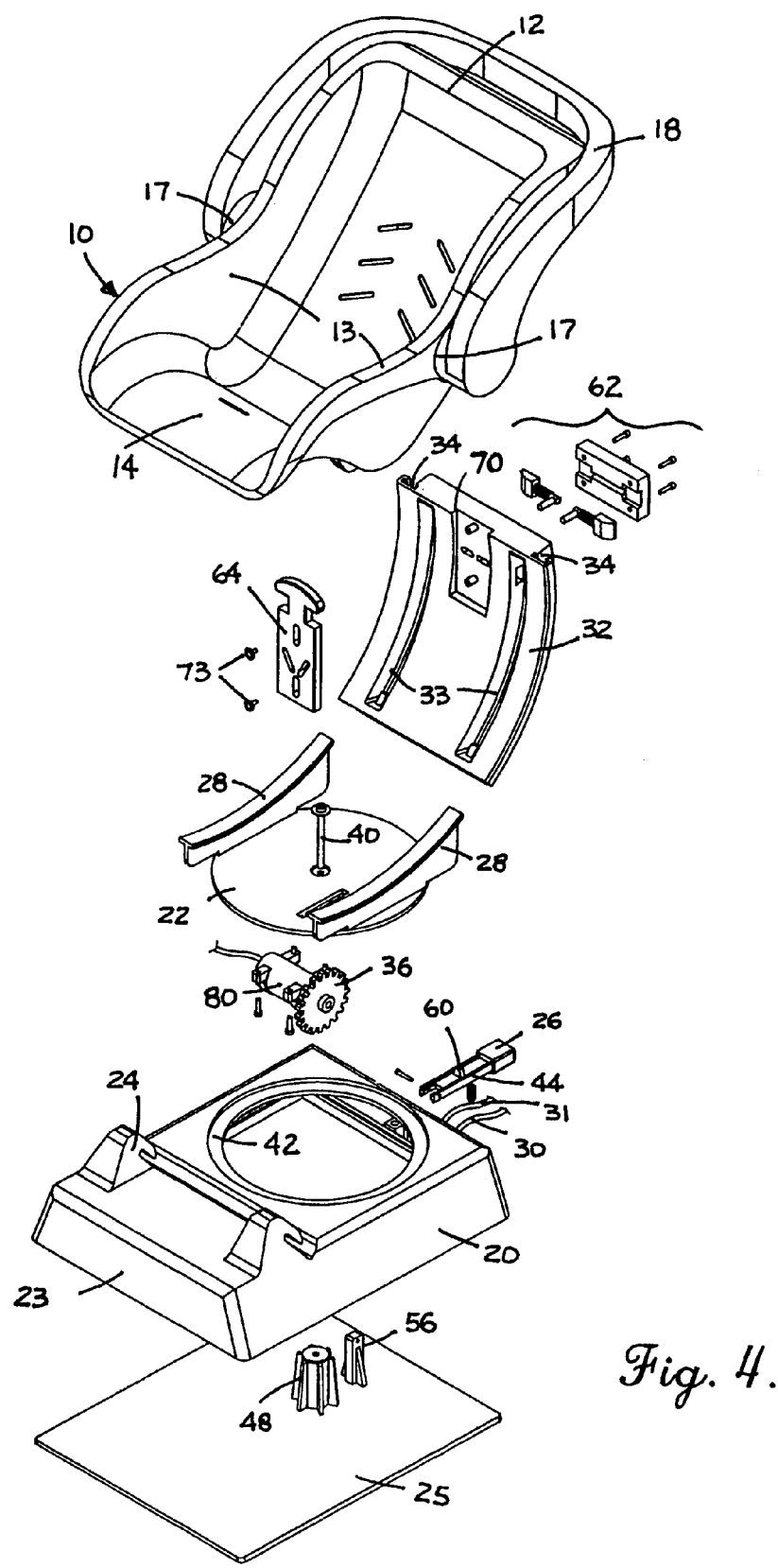
FIG. 4 is an exploded front perspective view of the first embodiment of the present invention.
Figure 5:
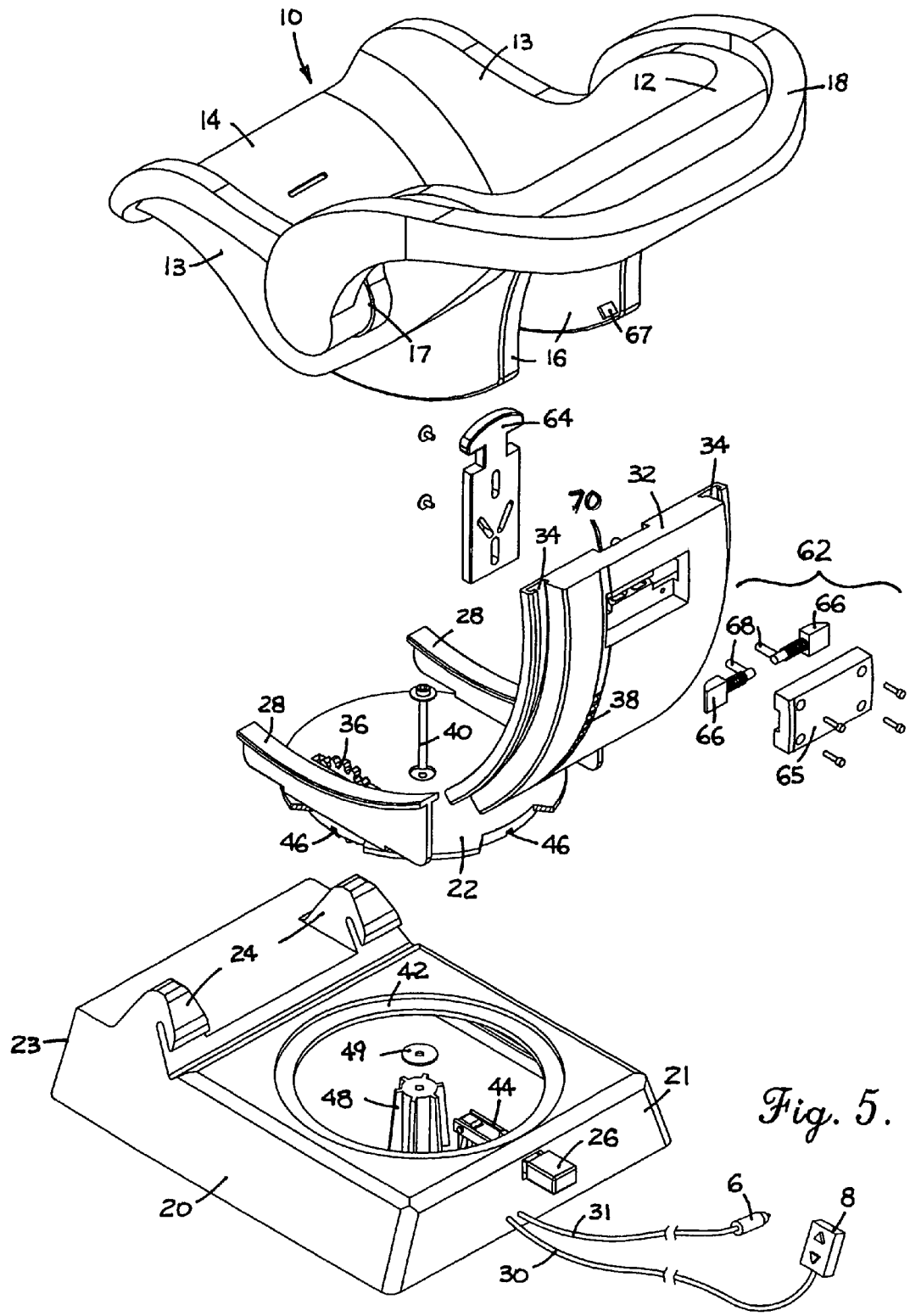
FIG. 5 is an exploded rear perspective view.

FIGS. 4 and 5 provide detailed illustrations of the components of the inventive child seat. Seat body 10 includes a back rest 12 and a seat section 14, both of which are recessed with side panels 13 to fully support the child's body. Slots illustrated in back rest 12 and seat section 14 provide for attachment of an appropriate safety harness (not shown) for securing the child in the seat. Seat body 10 is typically formed using a molded high impact plastic or polymer. Selection of an appropriate material is known to those of skill in the art. In the preferred embodiment, back rest 12 is sufficiently rounded to provide unimpeded swivel clearance relative to the backs of the vehicle front seats when the seat body is reclined.

Carrying handle 18 is attached at side pivots 17 disposed on side panels 13. When installed in the vehicle, carrying handle 18 is pivoted to a position just above the upper edge of seat back 12. Side pivots 17 are located to permit the seat body 10 to be properly balanced with the handle 18 rotated midway over the seat so that the seat body 10 doubles as a child carrier when removed from the recliner back plate 32. The underside of seat body 10 has a pair of rocker rails 16 that allow the child in the carrier to be rocked when the carrier is placed on a hard surface.

Figure 11:
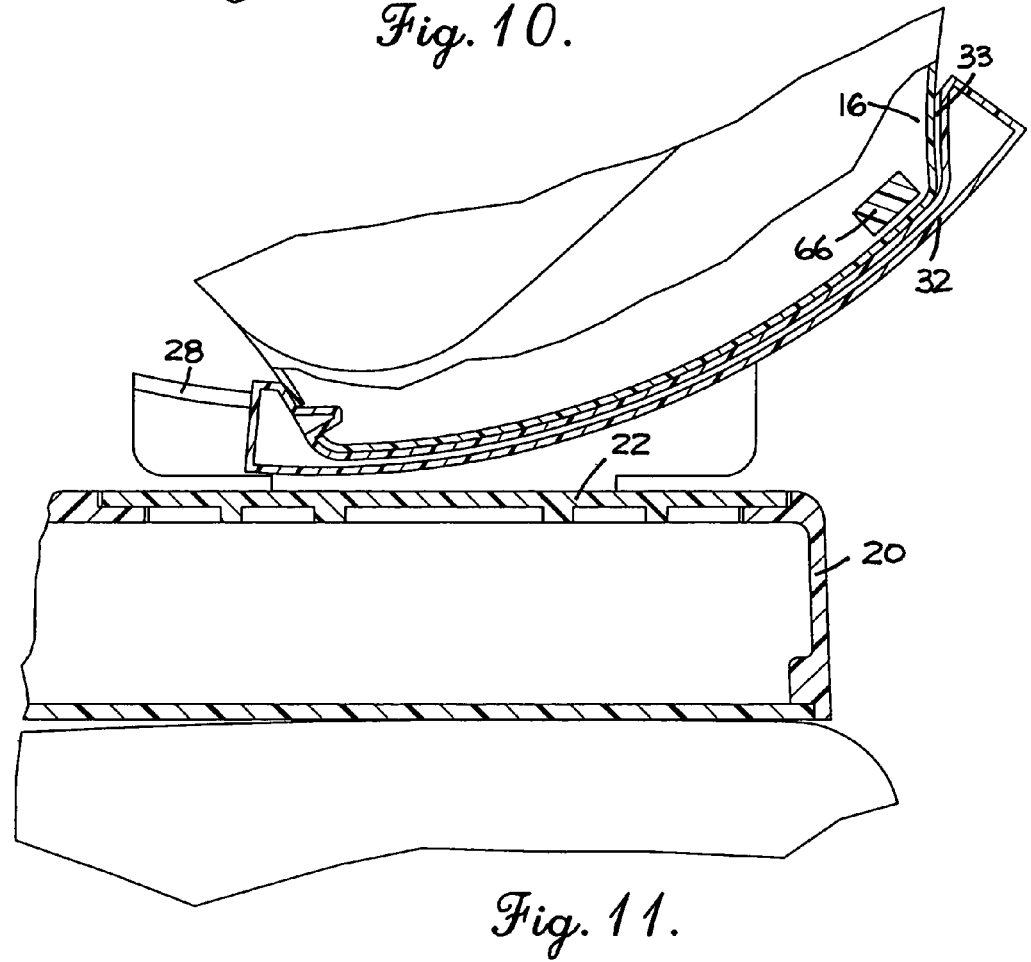
FIG. 11 is a cross-sectional view taken along line 11—11 of FIG. 8.

Seat body 10 is removably attached to recliner back plate 32 by way of a locking mechanism that utilizes the interaction between seat clasp 62 and slide lock 64. Slide lock 64 is slidably retained within recess 70 located near the upper edge of the front of recliner back plate 32. Support channels 33 receive rocker rails 16 for added stability. By pulling up on slide lock 64, the seat body 10 is released and can be lifted away from the base. Conversely, pushing down on slide lock 64 locks seat body 10 in place on back plate 32. Seat clasp 62 includes locking tabs 66 which are spring biased to project into notches 67 to hold seat body firmly in place on recliner back plate 32, as shown in FIG. 11. FIGS. 12 through 15 illustrate the detailed components and interaction of the seat clasp 62 and slide lock 64.

Figure 12:
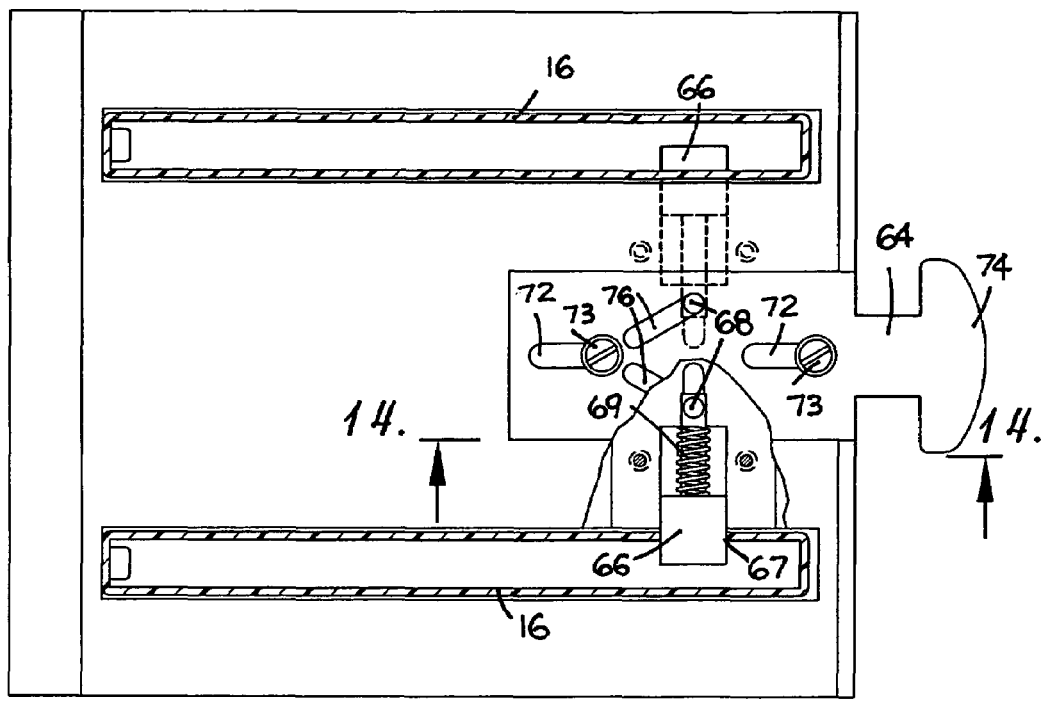
FIG. 12 is a cross-sectional view taken along line 12—12 of FIG. 6.
Figure 13:
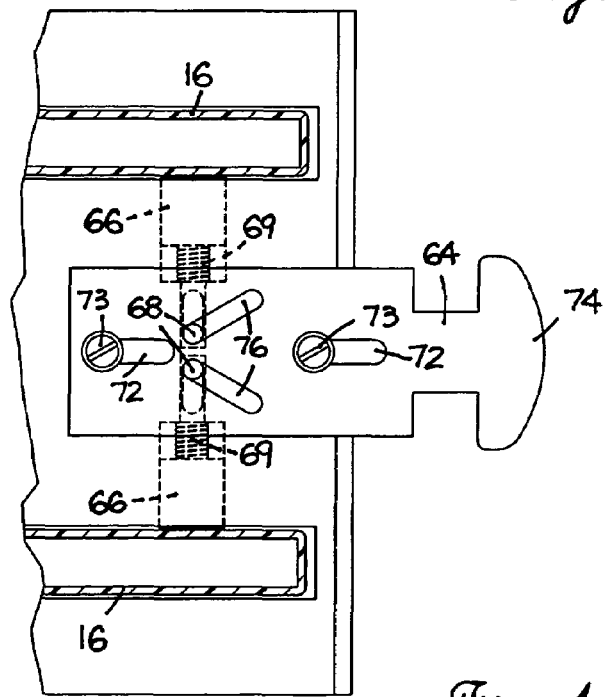
FIG. 13 is a detailed view showing the slide lock in pre-engagement alignment.
Figure 14:
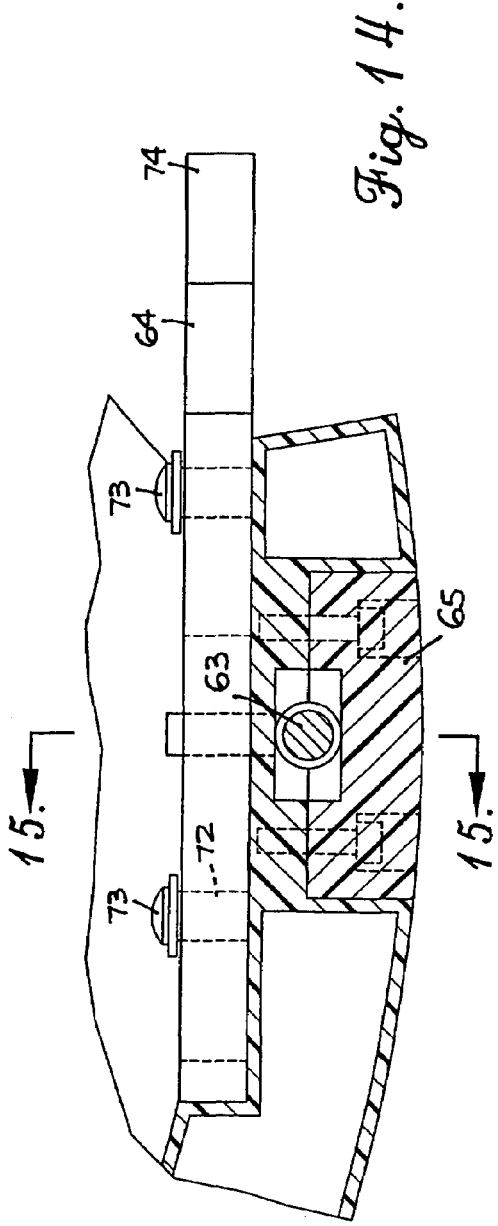
FIG. 14 is a cross-sectional view of the slide lock taken along line 14—14 of FIG. 12.
Figure 15:
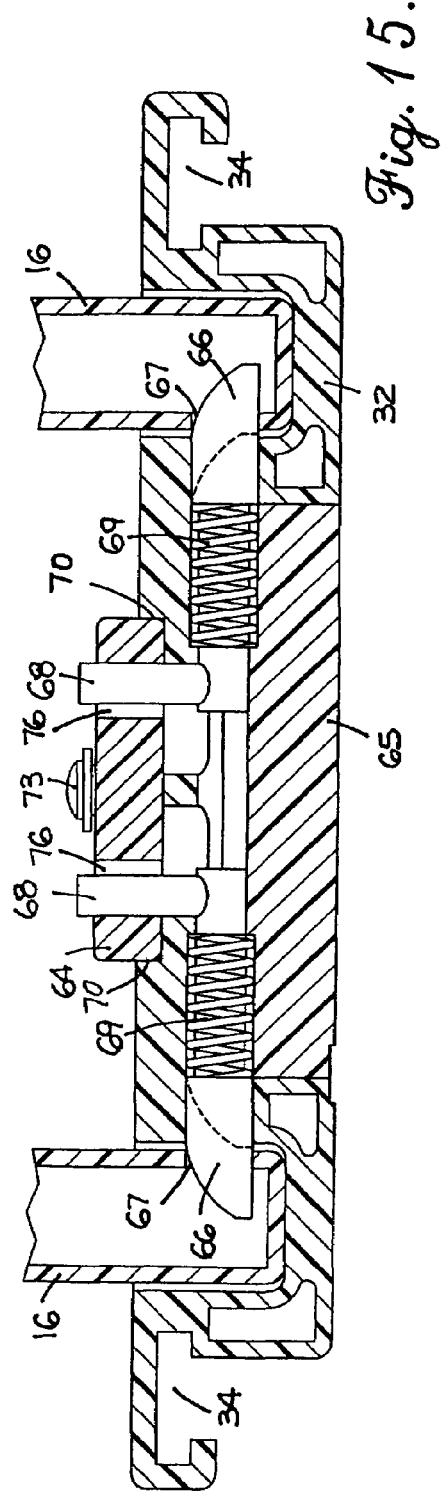
FIG. 15 is a cross-sectional view of the slide lock taken along line 15—15 of FIG. 14.

Seat clasp 62 comprises support plate 65 which attaches to the rear surface of back plate 32 to slidably retain locking tabs 66, each of which is attached via connector rod 63 to peg 68. Spring 68 fits over connector rod 63 to bias locking tab 66 in its fully extended position for insertion into notch 67. To release the engagement of tabs 66 in notches 67, pegs 68 must be moved inward to overcome the bias of spring 68. Movement of pegs 68 is controlled by slide lock 64, which is slidably retained within recess 70 and attached to recliner back plate 32 via fasteners 73 that extend through vertical slots 72. Pegs 68 extend through angled slots 76 such that when handle 74 is pulled vertically, angled slots 76 simultaneously guide pegs 68 inward, causing the tabs 66 to withdraw from notches 67. FIG. 12 illustrates slide lock 64 in the down, locked position. In this case, pegs 68 are at the upper ends of angled slots 76 and, thus, are at their widest separation. FIG. 13 illustrates slide lock 64 in the up, unlocked position. As shown, pegs 68 are at the lower ends of angled slots 76 at their narrowest separation, causing springs 69 to be fully compressed.

Figure 6:
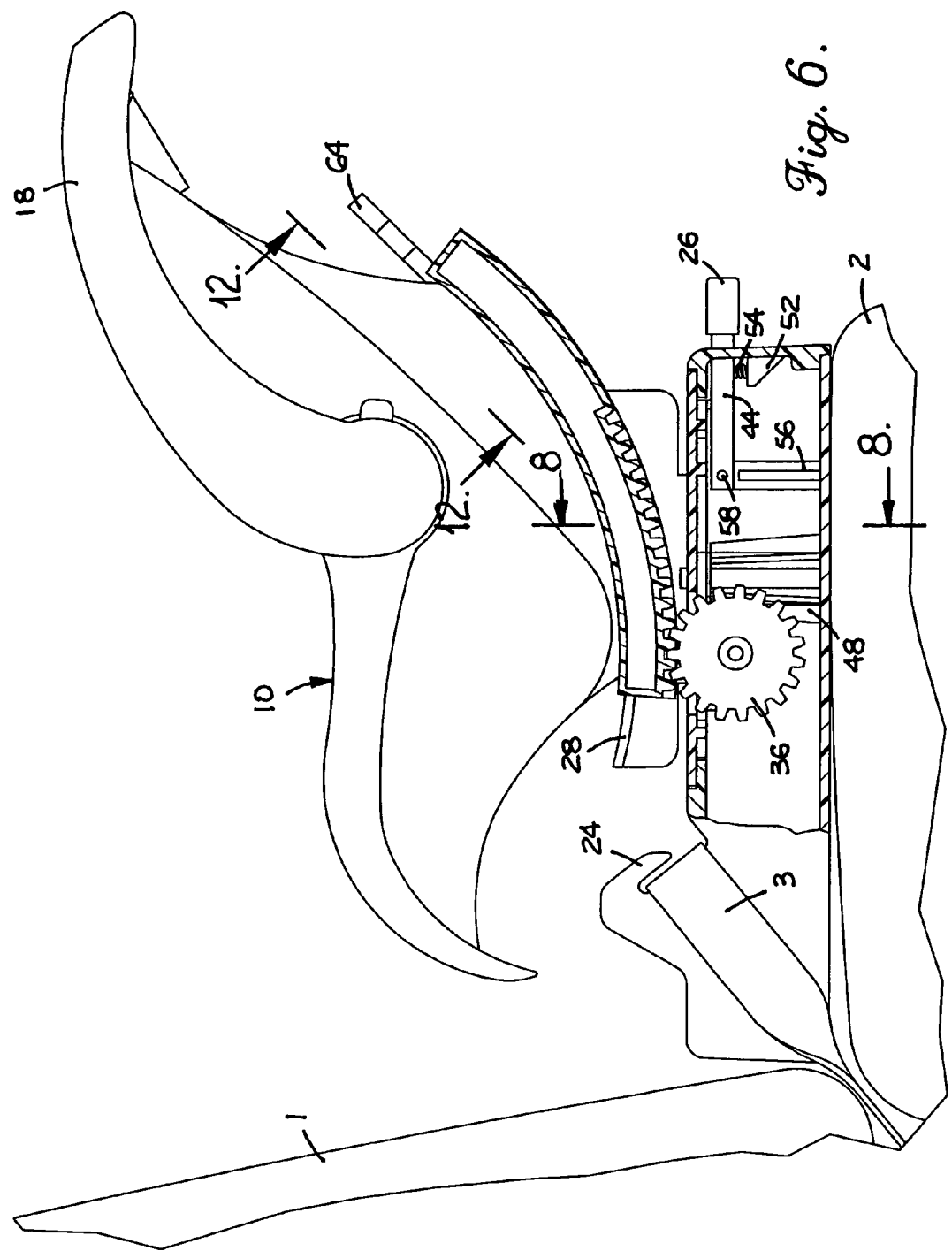
FIG. 6 is a side elevation of the child seat in the upright position with the base and reclining mechanism exterior partially cut away.
Figure 7:
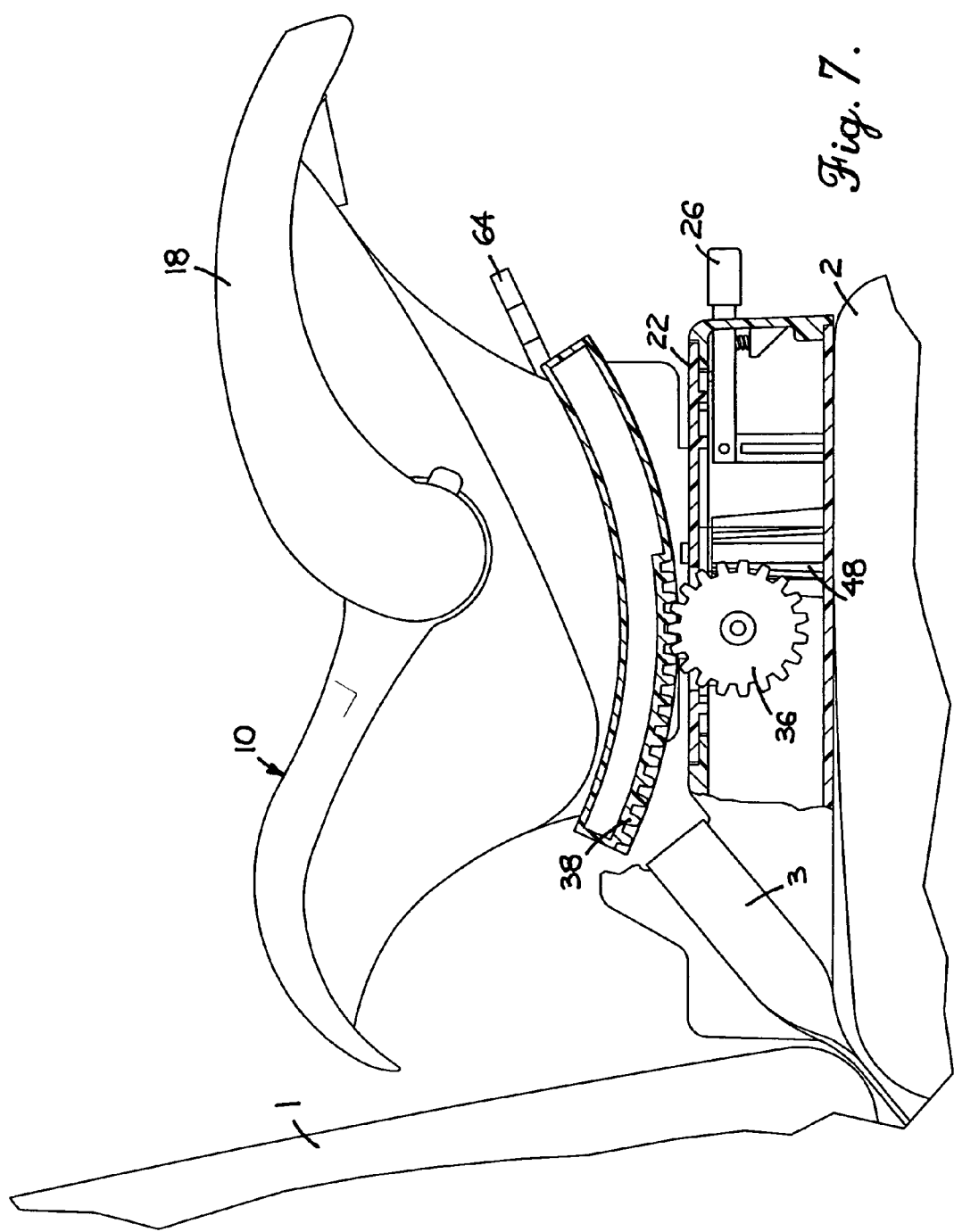
FIG. 7 is a side elevation of the child seat in a reclined position with the base and reclining mechanism exterior partially cut away.
Figure 8:
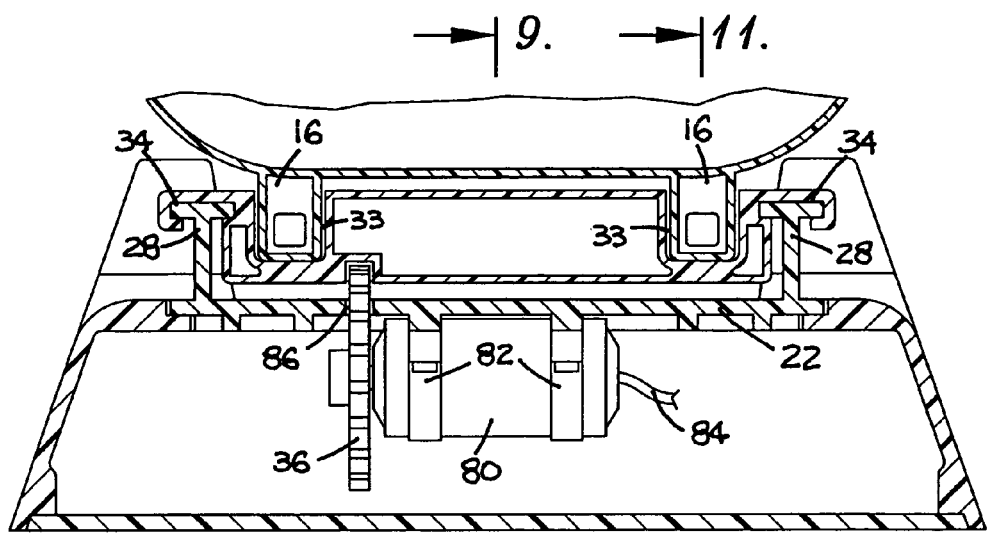
FIG. 8 is a cross-sectional view taken along line 8—8 of FIG. 6.

Referring back to FIGS. 4 and 5, recliner back plate 32 reclines seat body 10 sliding along arcuate guide rails 28. Guide rails 28 slide within recliner channels 34 in recliner back plate 32 controlled by the interaction of pinion gear 36, disposed on turntable 22, and arcuate rack 38 located in recliner back plate, as illustrated in FIGS. 6 and 7. Pinion gear 36 is driven by motor 80, the details of which are shown in FIG. 8.

Motor 80 is attached to the lower surface of turntable 22 by motor mounts 84 with gear 36 extending through gear slot 86. Power/control cable 84 provides electrical communication from motor 80 to remote cord 30 and power cord 31 (shown in FIG. 5). Power cord 31 connects to power plug 6 that is adapted to plug into the cigarette lighter of the vehicle to provide D.C. voltage power to the motor. Remote cord 30 connects to remote control 8, allowing the parent or caregiver in the front seat of the vehicle to remotely control the reclining motion of the child seat by pressing a button or toggle switch. In the preferred embodiment, motor 80 is a D.C. stepper motor, allowing the reclining motion can be stopped at any point within the recliner's range of motion. The user simply depresses the selected button until the desired angle is achieved. In another embodiment, the seat will travel to its full reclined or upright position with one press of the corresponding button. In still another embodiment, a cycling function may be added to activate a rocking feature that repeatedly moves the seat from a reclined position to upright and back again in order to soothe the child if he or she is awake and crying.

Referring again to FIGS. 4 and 5, turntable 22 rotates on turntable guide 42 on the top of base 20. Turntable base 48, located on base bottom 25, has a bore therethrough for receiving turntable bolt 40, which is the axis around which turntable 22 rotates. Washer 49 is disposed between the top of turntable base 48 and the lower surface of turntable 22.

Figure 9:
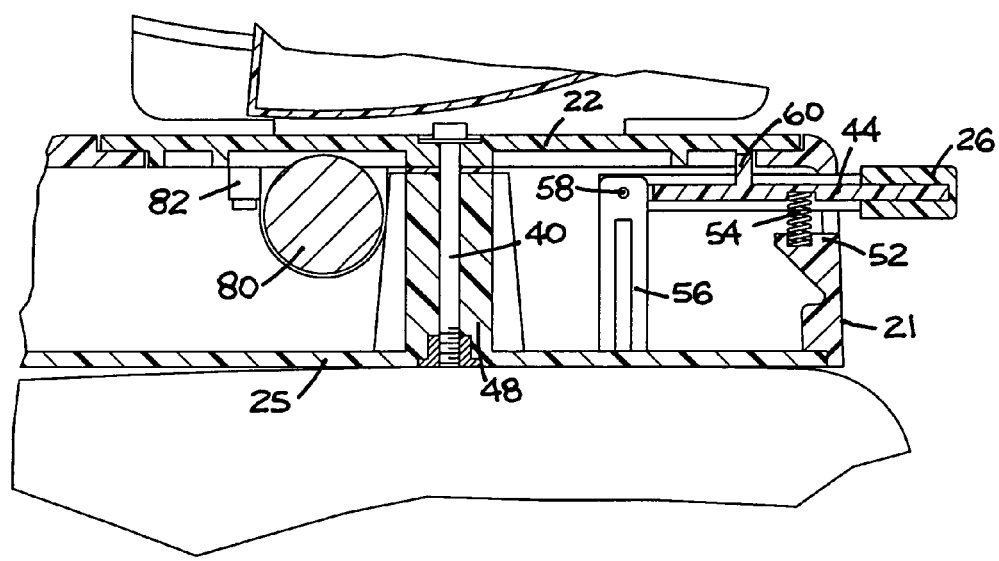
FIG. 9 is a cross-sectional view taken along line 9—9 of FIG. 8 with the turntable locking mechanism engaged.
Figure 10:
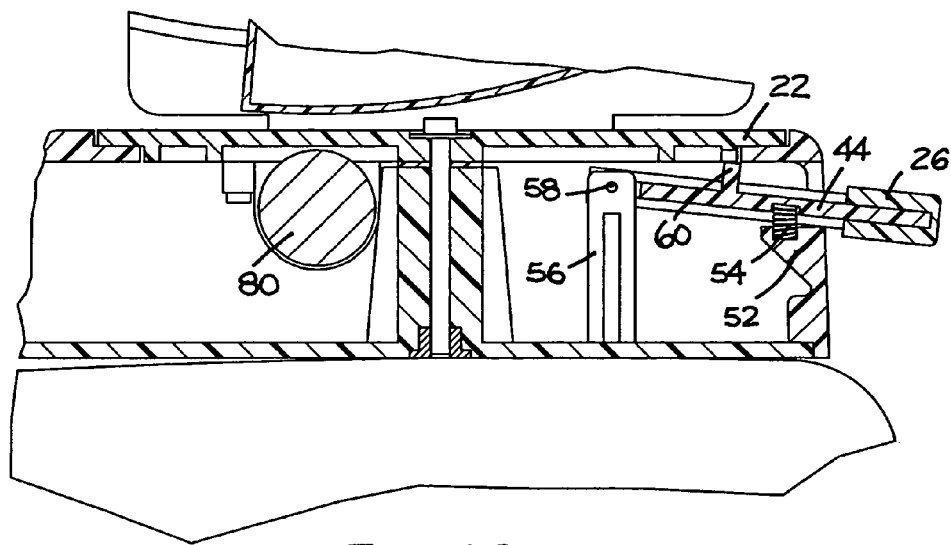
FIG. 10 is a cross-sectional view taken along line 9—9 of FIG. 8 with the turntable locking mechanism released.

Turntable 22 is normally locked in one of three or four positions 90 degrees apart. Three positions correspond to rear-facing, i.e., the safe-riding position, and facing either side of the vehicle, for loading and unloading. The fourth possible position places the child in a forward-facing orientation which may be useful for attending to the child when the vehicle is not in motion. Release of the turntable 22 for rotation of the child seat 10 is achieved by manually depressing turntable release 26. As illustrated in more detail in FIGS. 9 and 10, turntable release 26 includes a lever 44 pivotably attached by pivot pin 58 to lever support 56 on base bottom 25. Lever 44 is biased in an upward position by spring 54 which sits on spring base 52. In the normal position, locking pin 60 extends upward from lever 44 to interfit into one of the notches 46 that are formed at the 90 degree points in the lower surface of turntable 22. FIG. 9 shows the turntable locking mechanism in the normal, locked position. Pressing down on turntable release 26, as shown in FIG. 10, compresses spring 54 and removes locking pin 60 from notch 46, allowing the turntable to be rotated to the desired position by manually rotating the seat.

With two door vehicles, the parent or caregiver rarely has direct side access but must reach into the back seat from an angle with the front seat folded forward. In an alternate embodiment for use with such vehicles, additional notches 46 may be provided in turntable 22 at, e.g., 45 degrees or some other angle between 0° and 90° so that the child seat is positioned for easiest access from the vehicle door.

While manual control of the rotation is described and illustrated, it will be readily apparent to those of skill in the art that rotation of the child seat may also be achieved using a second motor or by a separate transmission driven by motor 80 so that the seat can be rotated by simply depressing a button on the side of the base. It is generally preferable for safety reasons that the rotation of the child seat occur only when the adult is nearby in manual contact with the seat.

A second embodiment for securing toddlers and older children who still utilize a child seat (over one year old, up to 40–50 pounds in weight) is illustrated in FIGS. 16–21. This embodiment is a forward-facing seat, i.e., the safe-riding position, which has the ability to be rotated to either side for ease in loading and unloading the child from the seat. It is particularly advantageous to be able to rotate the seat to face the side door when fastening, unfastening or adjusting the child's safety harness. The base 120 is positioned on the vehicle seat bottom 2 and held in place against the vehicle seat back 1 by vehicle seat belt 3. Hooks 124, loops or other appropriate fasteners are provided on the base 120 for securely holding the seat belt 3 so the child seat does not slide or shift on the vehicle seat.

Figure 16:
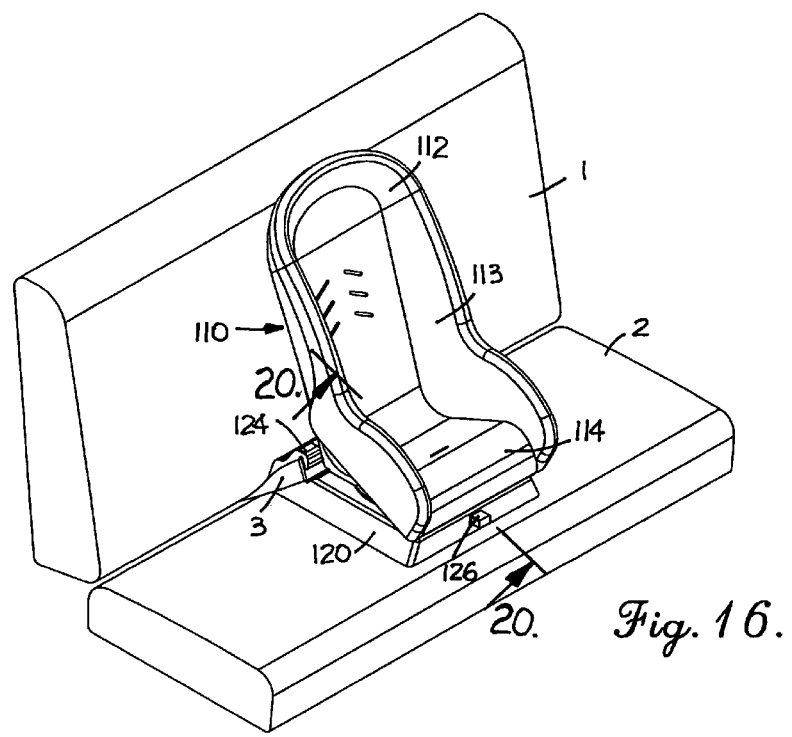
FIG. 16 is a perspective view of a second embodiment of the present invention in a forward-facing position.
Figure 17:
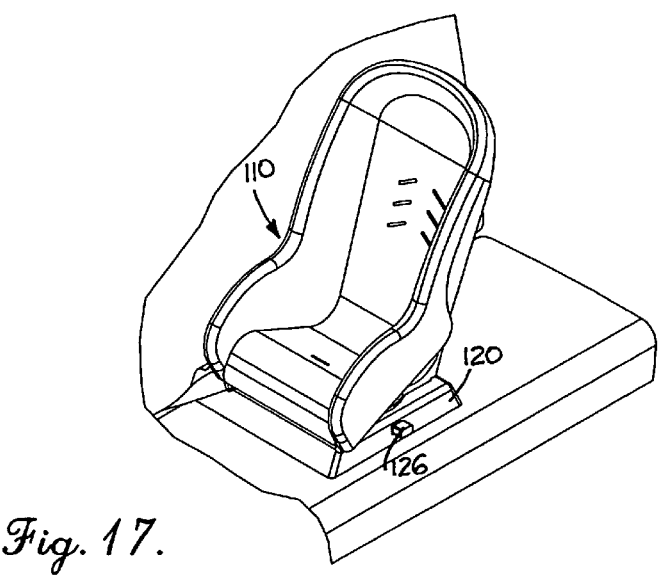
FIG. 17. is a perspective view of the second embodiment rotated 90 degrees.

FIGS. 16 and 17 illustrate child seat body 110 which includes a back rest 112 and a seat section 114, both of which are recessed with side panels 113 to fully support the child's body. Slots illustrated in back rest 112 and seat section 114 provide for attachment of an appropriate safety harness (not shown) for securing the child in the seat. Seat body 110 is typically formed using a molded high impact plastic or polymer. Selection of an appropriate material is known to those of skill in the art. In the preferred embodiment, back rest 112 is sufficiently rounded to provide unimpeded swivel clearance relative to the vehicle seat back 1. FIG. 16 shows the child seat 110 rotated in the forward-facing position for use when the vehicle is moving. FIG. 17 shows the child seat 110 rotated 90 degrees in a side-facing orientation for loading and unloading.

Figure 18:
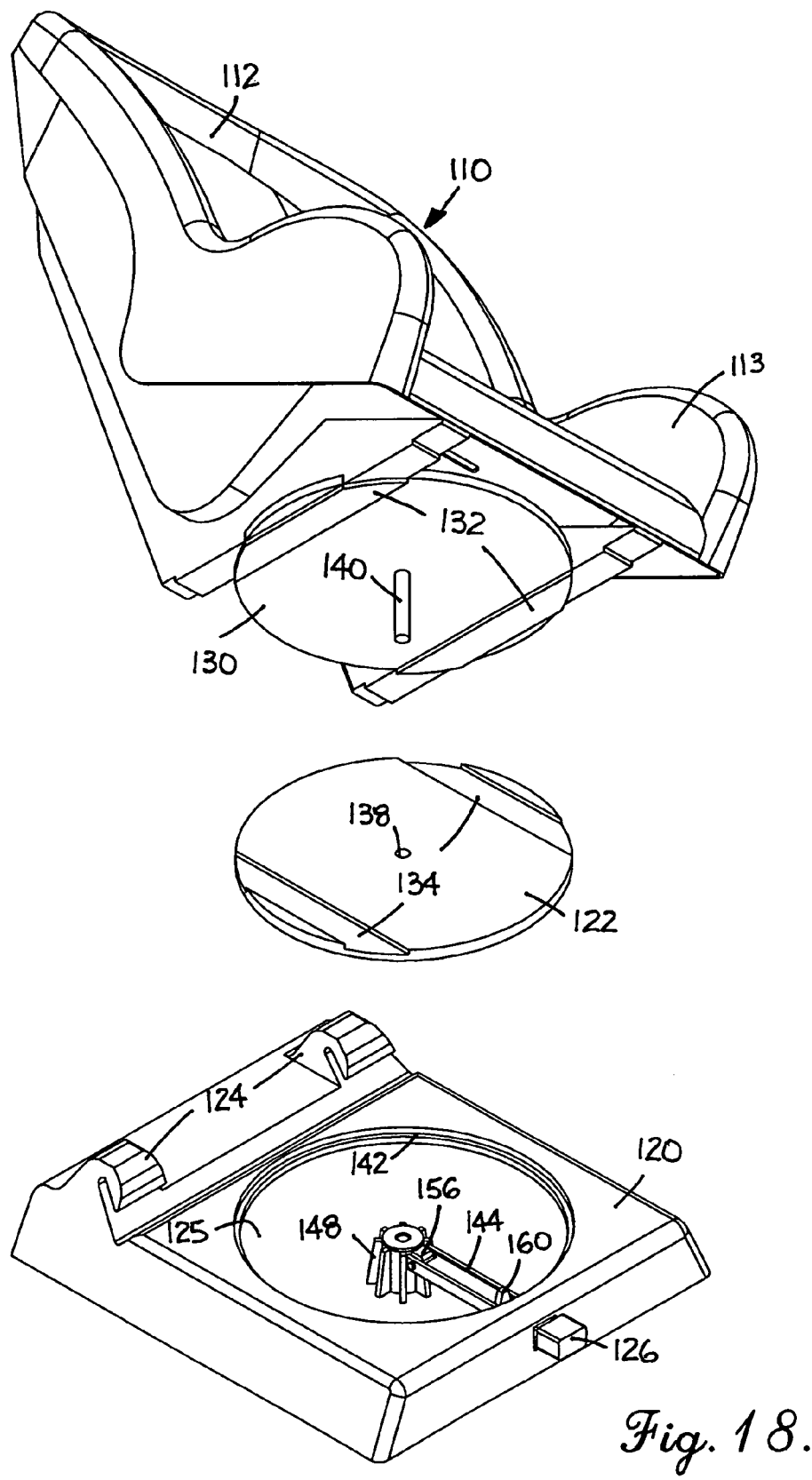
FIG. 18 is an exploded perspective view of the second embodiment.
Figure 18A:
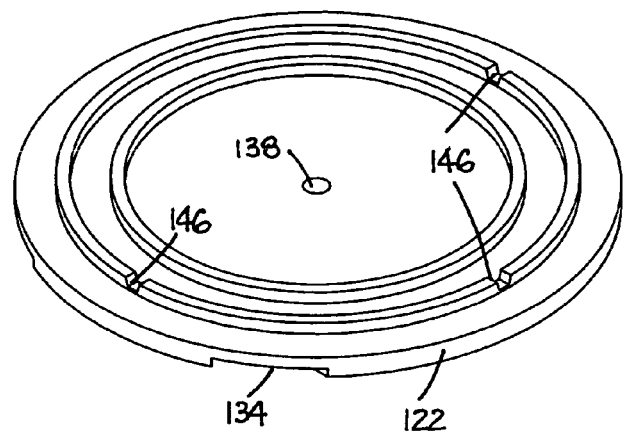
FIG. 18a is a detail view of the underside of a turntable of the second embodiment.
Figure 19:
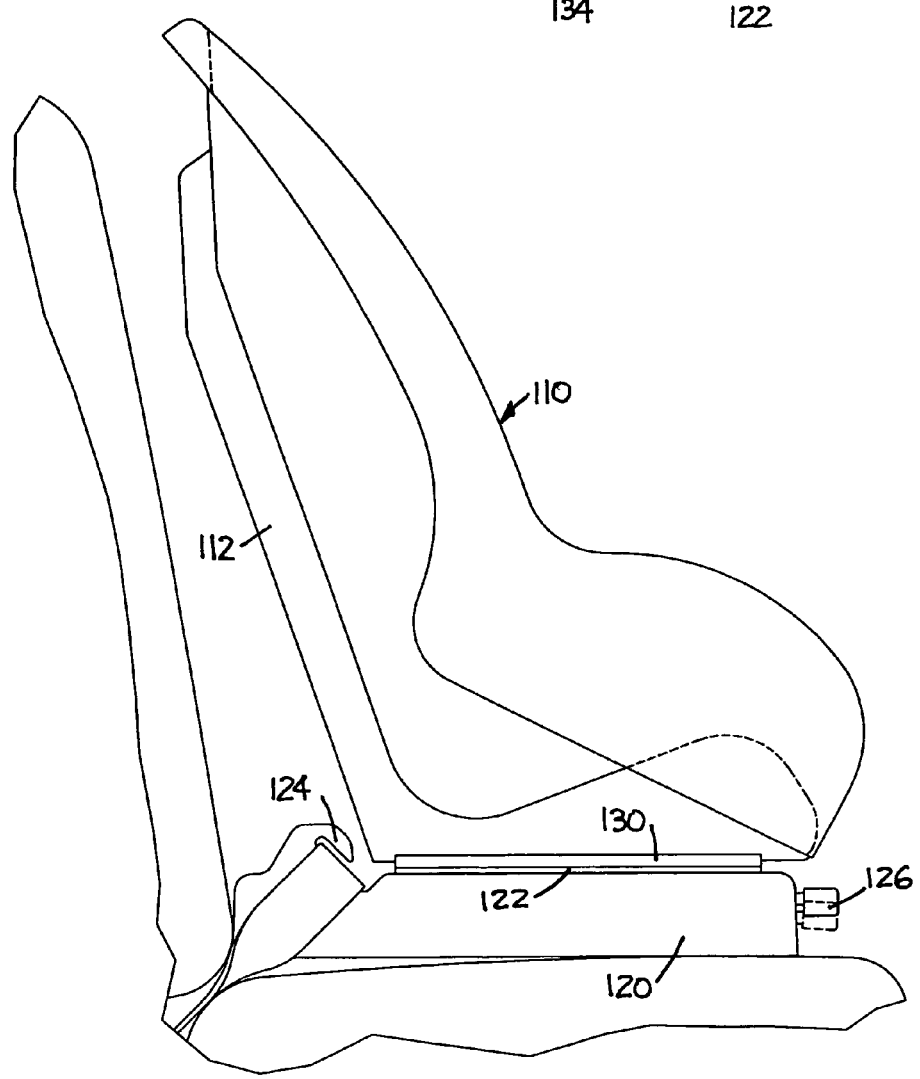
FIG. 19 is a diagrammatic side elevation of the second embodiment.

FIG. 18 illustrates the details of the working components of the child seat of the second embodiment. On the bottom of seat section 112 is a rounded plate 130 with pivot bolt 140 extending therefrom. Rails 132 cooperate with channels 134 in turntable 122 to securely hold the seat body 110 on the turntable. Pivot bolt 140 inserts through center bore 138 in turntable 122 for insertion into turntable base 148. FIG. 18a illustrates the underside of turntable 122 with notches 146.

The turntable release mechanism of the second embodiment is similar to that of the first embodiment. Turntable 122 rotates on turntable guide 142 on the top of base 120. Turntable base 148, located on base bottom 125, has a bore therethrough for receiving turntable bolt 140, around which turntable 122 rotates.

Turntable 122 is normally locked in one of three or four positions 90 degrees apart. Release of the turntable 122 for rotation of the child seat 110 is achieved by manually depressing turntable release 126. As illustrated in more detail in FIGS. 20 and 21, turntable release 126 includes a lever 144 pivotably attached by pivot pin 158 to lever support 156 on turntable base 148. Lever 144 is biased in an upward position by spring 154 which sits on spring base 152. In the normal position, locking pin 160 extends upward from lever 144 to interfit into one of the notches 146 that are formed at the 90 degree points in the lower surface of turntable 122. FIG. 20 shows the turntable locking mechanism in the normal, locked position. Pressing down on turntable release 126 compresses spring 154 and removes locking pin 160 from notch 146, allowing the turntable to be rotated to the desired position.

With two door vehicles, the parent or caregiver rarely has direct side access but must reach into the back seat from an angle with the front seat folded forward. In an alternate embodiment for use with such vehicles, additional notches 146 may be provided in turntable 122 at, e.g., 45 degrees or some other angle between 0° and 90° so that the child seat is positioned for easiest access from the vehicle door.

While manual control of the rotation is described and illustrated, it will be readily apparent to those of skill in the art that rotation of the child seat may also be achieved using a motor so that the seat can be rotated by simply depressing a button on the side of the base. It is generally preferable for safety reasons that the rotation of the child seat occur only when the adult is nearby in manual contact with the seat.

The child seat of the present invention addresses a significant problem experienced by parents and caregivers in maneuvering a child and/or infant carrier into and out of a vehicle. The inventive child safety seat sits securely on a rotating turntable that allows the seat to be rotated for easiest access to the seat when the child is being placed in or removed from the vehicle back seat. The infant safety seat of the present invention further provides for remotely adjusting the incline of the seat for when the child falls asleep.

It will be evident that there are additional embodiments that are not illustrated and/or described in the specification and drawings but that are clearly within the scope and spirit of the present invention. The foregoing description and accompanying drawings are, therefore, intended to be exemplary only, and the scope of the invention is to be limited solely by the appended claims.

What is claimed is:

1. A child safety seat for a vehicle, comprising:
  a seat body having a seat section and a backrest;
  a base having a seat belt securing means integrally formed in a rear portion thereof for securing the base to a vehicle seat, the base comprising a turntable for supporting the seat body, the turntable having a plurality of fixed angle positions corresponding to a safe-riding position and at least one load/unload position;
  a locking mechanism for releasably locking the turntable at one of the plurality of fixed angle positions, wherein the turntable remains locked at one of the plurality of fixed angle positions until released; and
  a recliner mechanism disposed between the seat body and the base, the recliner mechanism comprising:
    a drive motor attached to the turntable;
    a gear extending upwardly from the turntable, the gear driven by the drive motor;
    a back plate separably attached to the seat back;
    a rack disposed in the back plate, wherein the rack cooperates with the gear to control inclination of the back plate; and
    a power cord for supplying power to the drive motor.

2. The child safety seat of claim 1, wherein the recliner mechanism further comprises:
  a remote control for controlling the drive motor for adjusting inclination of the back plate from a location within the vehicle that is remote from the vehicle seat;
  a cord connecting the remote control to the drive motor.

3. The child safety seat of claim 2, further comprising:
  arcuate guide rails extending upward from the turntable; and
  arcuate channels disposed in the back plate, wherein the guide rails and the channels cooperate to support the back plate on the turntable and to guide inclination of the back plate in an arcuate motion.

4. The child safety seat of claim 2, wherein the seat body comprises a releasable infant carrier having rocker rails extending from a lower portion of the seat back and a pivotable carrying handle extending above the seat body.

5. The child safety seat of claim 4, wherein the back plate is releasably attached to the seat back by a slide lock and seat clasp mounted on the back plate, wherein the seat clasp comprises spring-loaded locking tabs adapted for projection through notches formed in the rocker rails.

6. The child safety seat of claim 5, wherein the slide lock slides vertically within a recess formed in the back plate, and wherein moving the slide lock in an upward motion causes the locking tabs to be retracted from the notches in the rocker rails.

7. The child safety seat of claim 4, wherein the safe-riding position is rear-facing.

8. The child safety seat of claim 1, wherein the at least one load/unload position comprises a 90 degree rotation from the safe-riding position.

9. The child safety seat of claim 1, wherein the locking mechanism comprises a spring-biased lever with a peg extending therefrom for insertion into one of a plurality of notches disposed on a lower side of the turntable, wherein the plurality of notches corresponds to the plurality of fixed angle positions.

10. A child safety seat for use in a vehicle, comprising:
  a seat body having a seat section and a backrest;
  a base having means for securing to a vehicle seat, the base comprising a turntable for supporting the seat body, the turntable having a plurality of fixed angle positions corresponding to a safe-riding position and at least one load/unload position;
  a turntable locking mechanism for releasably locking the turntable at one of the plurality of fixed angle positions, wherein the turntable remains locked at one of the plurality of fixed angle positions until released;
  a remotely-adjustable recliner mechanism disposed between the seat body and the base, wherein the recliner-mechanism comprises:
    a back plate separably attached to the seat back;
    a drive motor attached to the turntable;
    a gear extending upwardly from the turntable, the gear driven by the drive motor;
    a rack disposed in the back plate, wherein the rack cooperates with the gear to control inclination of the back plate;
    a remote control for controlling the drive motor for adjusting inclination of the back plate;
    a power cord for supplying power to the drive motor; and
    a cord connecting the remote control to the drive motor.

11. The child safety seat of claim 10, wherein the seat body comprises a releasable infant carrier having rocker rails extending from on a lower portion of the seat back and a pivotable carrying handle extending above the seat body.

12. The child safety seat of claim 11, wherein the back plate is releasably attached to the seat back by a slide lock and seat clasp mounted on the back plate, wherein the seat clasp comprises spring-loaded locking tabs adapted for projection through notches formed in the rocker rails.

13. The child safety seat of claim 12, wherein the slide lock slides vertically within a recess formed in the back plate, and wherein moving the slide lock in an upward motion causes the locking tabs to be retracted from the notches in the rocker rails.

14. The child safety seat of claim 10, wherein the at least one load/unload position comprises a 90 degree rotation from the safe-riding position.

15. The child safety seat of claim 10, wherein the turntable locking mechanism comprises a spring-biased lever with a peg extending therefrom for insertion into one of a plurality of notches disposed on a lower side of the turntable, wherein the plurality of notches corresponds to the plurality of fixed angle positions.

16. The child safety seat of claim 10, further comprising:
  arcuate guide rails extending upward from the turntable;
  arcuate channels disposed in the back plate, wherein the guide rails and the channels cooperate to support the back plate on the turntable and to guide inclination of the back plate in an arcuate motion.

17. A child safety seat for securing to a vehicle seat, the safety seat comprising:
  a seat body having a seat section and a backrest;
  a base having a seat belt securing means integrally formed in a rear portion thereof for securing the base to a vehicle seat; and
  a recliner mechanism disposed between the seat body and the base, the recliner mechanism comprising:
    a drive motor attached to the base;

a gear extending upwardly from the base, the gear driven by the drive motor;

a back plate separably attached to the seat back;

a rack disposed in the back plate, wherein the rack cooperates with the gear to control inclination of the back plate;

a power cord for supplying power to the drive motor;

a remote control for controlling the drive motor for adjusting inclination of the back plate from a location that is remote from the vehicle seat; and a cord connecting the remote control to the drive motor.

18. The child safety seat of claim 17 further comprising:

a turntable disposed within the base for supporting the seat body, the turntable having a plurality of fixed angle positions corresponding to a safe-riding position and at least one load/unload position; and a locking mechanism for releasably locking the turntable at one of the plurality of fixed angle positions, wherein the turntable remains locked at one of the plurality of fixed angle positions until released.

* * * * *